United States Patent Office 2,719,022
Patented Sept. 27, 1955

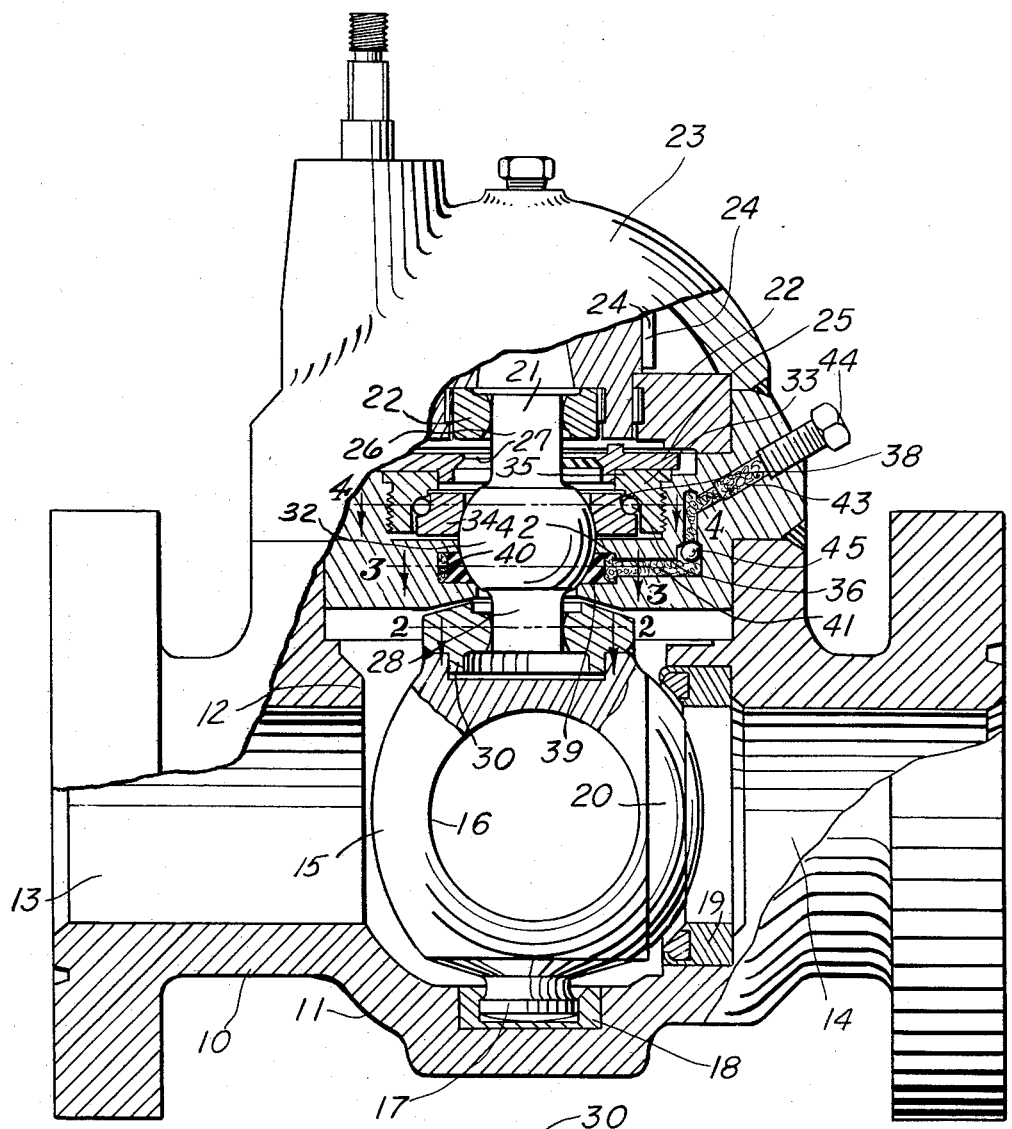
Fig. 1
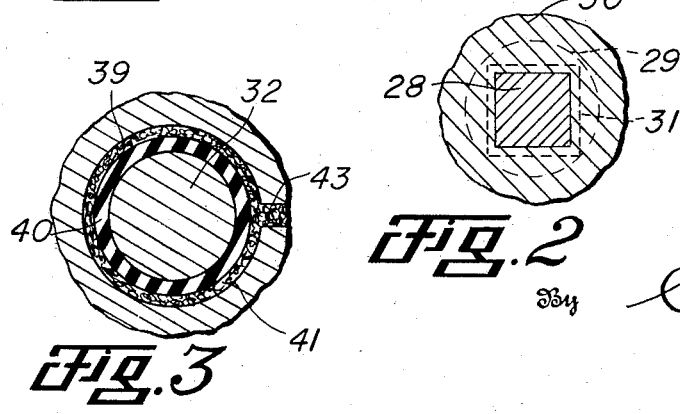
Fig. 2
Fig. 3
Inventor
Don W. Blevans
By
Ashley & Ashley
ATTORNEYS Sept. 27, 1955     D. W. BLEVANS     2,719,022
VALVES
Filed June 26, 1950     2 Sheets-Sheet 2
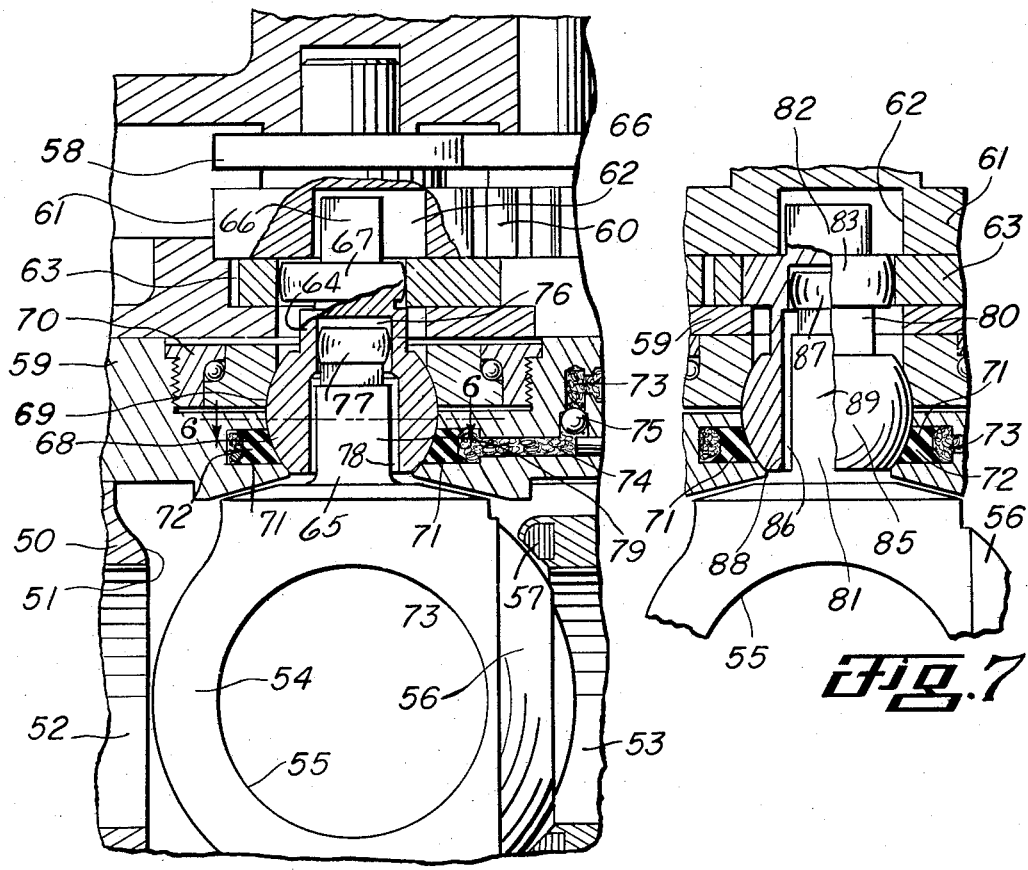
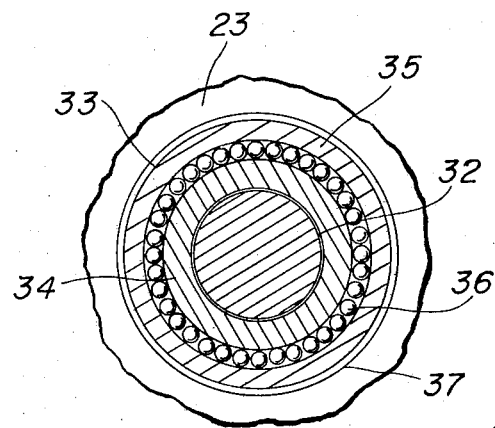
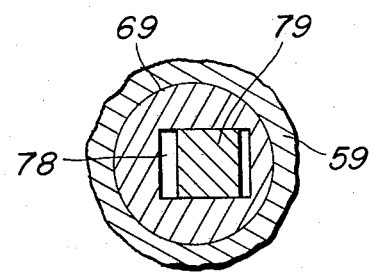
Inventor
Don W. Blevans
ATTORNEYS

2,719,022
VALVES

Don W. Blevans, Tulsa, Okla., assignor to Orbit Valve Company, Tulsa, Okla., a corporation of Oklahoma Application June 26, 1950, Serial No. 170,432

18 Claims. (Cl. 251—163)

This invention relates to new and useful improvements in valves and more particularly to means for sealing off between the operating mechanism and flow passage of a valve.

One object of the invention is to provide an improved valve having novel means for sealing off the operating mechanism of the valve from its flow passage whereby corrosive fluids may be successfully handled by said valve over a prolonged period of time.

Another object of the invention is to provide an improved valve having a rotatable, tiltable core and an operating mechanism for rotating and tilting the core with connecting means therebetween of such construction that the mechanism may be packed off from said core and the thrusts imposed thereupon absorbed irrespective of the rotation and tilting of said core.

An important object of the invention is to provide improved sealing means for a plug type valve, of the character described, wherein a connection including a spherical enlargement and complementary socket means extends between the core and the operating mechanism for transmitting rotative and tilting movement to said core whereby the movement of the latter is about the axis of the enlargement and whereby packing off around said enlargement positively seals said mechanism from the flow passage of the valve.

A particular object of the invention is to provide an improved valve seal, of the character described, wherein the connection includes a member having a substantially spherical ball and bearing means is associated with the ball for absorbing thrusts imposed axially and laterally upon said core.

A further object of the invention is to provide an improved valve seal, of the character described, wherein the stem of a valve core may be pivotally connected to the connecting member so as to reduce the lateral thrust exerted upon the bearing means.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a view, partly in elevation and partly in section, of a plug type valve which includes an operating mechanism and having sealing means constructed in accordance with the invention, Fig. 2 is a horizontal, cross-sectional view, taken on the line 2—2 of Fig. 1, Fig. 3 is a horizontal, cross-sectional view, taken on the line 3—3 of Fig. 1, Fig. 4 is a horizontal, cross-sectional view, taken on the line 4—4 of Fig. 1, Fig. 5 is a transverse, vertical, sectional view, showing a modified valve seal applied to a valve having another form of operating mechanism, Fig. 6 is a horizontal, cross-sectional view, taken on the line 6—6 of Fig. 5, and Fig. 7 is a view, similar to Fig. 5, showing a further modification of the valve seal.

In the drawings, the numeral 10 designates a valve of the plug type which is generally employed to control the flow of fluids under high pressure. The valve includes a housing or body 11 having an upright, substantially cylindrical bore or chamber 12 and axially alined, lateral inlet and outlet passages 13 and 14, respectively, communicating with the chamber. A valve element or core 15, having a diametric port 16 of a diameter substantially equal to the diameter of the inlet and outlet passages 13 and 14, is rotatably mounted in the chamber 12 by a pivot pin or trunnion 17 depending axially from the core and movably confined in a socket or recessed bearing plate 18 countersunk in the bottom of said chamber. The valve core 15 is of general spherical shape and is free to rotate about its vertical axis as well as to rock or tilt transversely due to its mounting.

An annular, bevelled valve seat 19 is mounted in the inner end of the outlet passage 14 and is adapted to be engaged by a complementary valve face 20 formed on the exterior of the spherical core at a substantially right angle to its diametric port 16. As shown in Fig. 1, the valve face 20 is in axial alinement with the valve seat 19 and is adapted to be moved into sealing engagement therewith by rocking or tilting movement of the core transversely of its axis of rotation. Upon rotation of the core 90° its port is moved into registration with the inlet and outlet passages for permitting flow through the valve. For imparting rotative and tilting movement to the core, a connection in the form of an upright connecting member or rocker 21 extends between the upper end of said core and an operating mechanism which is indicated generally by the numeral 22 and which is housed in a bonnet 23 overlying and secured to the upper end of the valve body 11 so as to form a part or continuation thereof. The operating mechanism 22 is not described in detail because it forms no part of the present invention and is similar to the mechanism shown in my co-pending application Serial No. 150,377, filed March 18, 1950, now Patent No. 2,690,894. It is believed sufficient to state that the operating mechanism is so constructed that rotative and tilting movement may be imparted to the valve core through the member 21 and, for this purpose, includes eccentric drive means 24 and driven means 25. As shown by the numeral 26, the upper end of the connecting member 21 is square in cross-section and has slidable connection with the driven means 25 by a slot 27 formed in said means.

A square shank 28 is provided on the lower end of the member for pivotal connection with a complementary socket member 30 secured to the upper end of the core 15 (Fig. 2). As shown by the numeral 31, the square portion of the bore of the socket member is rounded or bevelled to permit limited rocking or tilting movement of the shank 28 relative to said socket member. A substantially spherical enlargement or ball 32 is formed on the intermediate portion of the member and is mounted in a complementary socket 29 formed in the lower portion of the bonnet 23. A thrust bearing 33, which includes inner and outer annular races 34 and 35 for confining a plurality of balls 36 therebetween, encircles the upper portion of the ball 32 and forms a part of the socket 29 (Fig. 4). The bonnet 23 has a bore 37 above the socket for receiving and supporting the bearing 33 by having the outer race 35 screw-threaded thereinto. In addition to surrounding the balls 36 internally and externally, the inner and outer races of the bearing have annular, radially-directed flanges or lips for underlying and overlying said balls. Thus, the balls are confined against axial or vertical as well as lateral displacement, whereby the bearing absorbs axial or vertical thrusts as well as lateral thrusts exerted upon the valve core and transmitted to the member. A bevelled face 38, complementary to the curvature of the ball 32, is formed on the inner peripheral surface of the inner race 34 so as to permit pivoting of said ball transversely about its axis.

Due to the provision of the bearing balls, the inner race is adapted to rotate with the ball of the member.

An annular groove or recess 39 is formed in the socket in surrounding relation to the lower portion of the ball. An annular packing member or ring 40, of synthetic rubber or other suitable elastic material, is confined in the groove 39 and has its inner peripheral surface bevelled or arced transversely complementary to the curvature of the ball. For maintaining the packing ring 40 in sealing engagement with the ball pivot, plastic packing 41, in the form of a heavy or viscous fluid, is disposed in the groove 39 in surrounding relation to the external periphery of said ring. External, angular sealing lips 42 are formed on the upper and lower margins of the packing ring for confining the plastic packing 41 and preventing pressure fluid from by-passing said ring. An angular, radially-directed port 43 is provided in the lower portion of the bonnet for supplying plastic packing to the groove and said packing is maintained under pressure by means of a set screw 44 screw-threaded in the outer end of the port and a ball check valve 45. Manifestly, the seal provided by the packing ring and the plastic packing prevents any fluid in the bore 12 of the valve body from passing upwardly around the member 21 into contact with the operating mechanism 22. At the same time, this seal permits rotation as well as tilting or rocking movement of the member about the axis of its ball. Thus, the desired movement is transmitted from the operating mechanism to the valve core while maintaining a positive seal therebetween.

As set forth hereinbefore, the bearing 33 functions as a part of the socket for the ball of the member so as to absorb all thrusts transmitted to said member from the valve core irrespective of the positions of said core and member. When the stem is rocked in a counter-clockwise direction, the valve core is tilted in the opposite direction so as to move its annular face 20 into engagement with the seat 19. Therefore, the valve core is tilted to the left or in a counter-clockwise direction and its face is moved out of engagement with the seat upon rocking of the stem in an opposite or clockwise direction. In the latter position, the member is adapted to be rotated for imparting rotation to the core. Since the curvature of the ball is symmetrical and since the packing ring is in constant engagement with portions of said ball due to all movement of the member being about the axis of the latter, it is manifest that a substantially positive seal is provided without interfering with the requisite movement of said member.

In Figs. 5 and 6, a slightly modified form of the invention is shown applied to a similar valve having a similar body 50 which includes an axial bore 51 and flow passages 52 and 53. A valve core 54 is rotatably mounted in the bore 51 and has an axial port 55 for registration with the passages and a valve face 56 for engagement with a valve seat 57 mounted in the outlet passage 53. A modified operating mechanism 58 is mounted in a suitable housing or bonnet 59 and secured to and forming a part of the body 50 and includes drive means 60 and driven means 61 for rotating the valve core about its vertical axis and tilting or rocking the same transversely of its axis of rotation. A slot 62 is formed in the driven means 61 for limiting or controlling tilting movement of the valve core and link means 63 is slidably mounted below said driven means for imparting such movement to said core. It is noted that the operating mechanism 58 is constructed substantially in accordance with my co-pending application Serial No. 150,377, filed March 18, 1950, now Patent No. 2,690,894, and in itself forms no part of the present invention.

The operating mechanism is connected to the valve core by a connection which includes a connecting member 64 and a coacting stem 65 secured to and projecting upwardly from said core. A square pin 66 is formed on the upper end of the member 64 for engagement within the slot 62, while an eccentric or offset enlargement 67 is provided below the shank for connection with the link means 63. The periphery of the annular enlargement 67 is rounded or bevelled to permit rocking or tilting movement of the member 64 relative to the link means. A substantially spherical ball or enlargement 68, similar to the ball 32, is formed on the lower portion of the member 64 for supporting engagement with a complementary socket 69 formed in the lower portion of the housing 59. The socket 69 includes a bearing 70 which is substantially identical to the bearing 33 and which has its inner race engaging the upper portion of the ball pivot 68. The lower portion of the socket has an annular groove 71 for receiving a packing ring 72 and plastic packing 73 which are similar to the groove 39, the packing ring 40 and plastic packing 41. A similar angular port 74, having a similar ball check valve 75, communicates with the groove 71 for supplying plastic packing thereto.

For pivotally connecting the stem 65 to the member 64, an axial bore 76 is formed in the lower portion of said member and a bevelled or rounded head or enlargement 77 is formed on the upper end of said stem for engaging with the bore. The lower portion of the bore 76 is elongated transversely to provide a slot 78 for coaction with the lower portion of the stem which is square in cross-section as shown by the numeral 79. It is noted that the slot 78 extends parallel to the slot 62 and the axis of the valve face and seat 56 and 57 so as to permit transverse movement of the stem and valve core toward and away from said seat. Due to the square pin 66 of the member 64 and the square portion 79 of the stem, it is manifest that rotation of the driven means 61 is transmitted to the valve core. It is noted that this form of the invention operates in the same manner as the first form and that the only difference in construction resides in the provision of a stem in addition to the connecting member, either form being usable with either operating mechanism. Due to the pivotal connection between the stem and the member provided by the enlarged bevelled head 77 of said stem, a considerable portion of the lateral thrust imposed upon the valve core is absorbed by said member instead of being transmitted to the inner race of the bearing 70.

A further modification is shown in Fig. 7 and includes a connecting member 80 and a co-acting stem 81 which are similar to the member 64 and stem 65 and which form a connection between the operating mechanism and valve core. In addition to a square pin 82 at its upper end, the member 80 includes a similar, eccentric enlargement 83 and a similar spherical ball or enlargement 85. An elongated bore 86 is formed in the member 80 so as to extend into the enlargement 83. The stem 81 is also elongated whereby its enlarged, bevelled or rounded head 87 is disposed within the upper extremity of the bore 86 so as to be in substantial horizontal alinement with the enlargement 83. As shown by the numerals 88 and 89, the lower portions of the bore and stem are rectangular and square, respectively, in the same manner as the slot 78 and the square portion 79 of the stem 65. The other elements are identical and have been given the same numbers. The advantage of this form of the invention resides in the increased leverage obtained by raising the pivotal connection between the stem and connecting member. Due to this increased leverage, less force is required to actuate the mechanism and the load on the link means 63 is reduced. Virtually all lateral thrusts are transmitted to the link means by the head 87 of the stem 81 so as to relieve the member 80 from said thrusts. Therefore, only vertical thrusts are imposed upon the inner race of the bearing 70 and, since such thrusts are caused by fluid pressure within the valve body, the load is not excessive and less force is required to impart tilting movement to the connecting member and valve core.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a valve having inlet and outlet openings in its body, a chamber communicating with the openings and having a seat, a valve core journaled in the chamber for rotative and transverse tilting movements therein relative to said seat to control flow through the openings, an operating mechanism for imparting rotative and transverse tilting movements to the valve core; independent connecting means extending between and tiltable transversely relative to the operating mechanism and valve core for transmitting movement from said mechanism to said core, the connecting means having a substantially spherical enlargement and being movable about the axis of its enlargement, and socket means in the body supporting the spherical enlargement.

2. In a valve having inlet and outlet openings in its body, a chamber communicating with the openings and having a seat, a valve core journaled in the chamber for rotative and transverse tilting movements therein relative to said seat to control flow through the openings, an operating mechanism for imparting rotative and transverse tilting movements to the valve core; independent connecting means extending between and tiltable transversely relative to the operating mechanism and valve core for transmitting movement from said mechanism to said core, the connecting means having a substantially spherical enlargement and being movable about the axis of its enlargement, socket means supporting the spherical enlargement, and packing means in the socket means surrounding and sealingly engaging said enlargement so as to seal off said mechanism from the chamber of the valve body.

3. In a valve having inlet and outlet openings in its body, a chamber communicating with the openings, and having a seat, a valve core journaled in the chamber for rotative and transverse tilting movements therein relative to said seat to control flow through the openings, an operating mechanism for imparting rotative and transverse tilting movements to the valve core; independent connecting means extending between and tiltable transversely relatively to the operating mechanism and valve core for transmitting movement from said mechanism to said core, the connecting means having a substantially spherical enlargement and being movable about the axis of its enlargement, socket means supporting the spherical enlargement, and bearing means in the socket means surrounding said enlargement for absorbing the thrusts exerted upon said core.

4. In a valve having inlet and outlet openings in its body, a chamber communicating with the openings and having a seat, a valve core journaled in the chamber for rotative and transverse tilting movements therein relative to said seat to control flow through the openings, an operating mechanism for imparting rotative and transverse tilting movements to the valve core; independent connecting means extending between and tiltable transversely relative to the operating mechanism and valve core for transmitting movement from said mechanism to said core, the connecting means having a substantially spherical enlargement and being movable about the axis of its enlargement, socket means supporting the spherical enlargement, packing in the socket means for sealingly engaging said enlargement so as to seal off between said mechanism and the chamber of the valve body, and bearing means in said socket means for absorbing the thrusts exerted upon said core.

5. In a valve having inlet and outlet openings in its body, a chamber communicating with the openings and having a seat, a valve core journaled in the chamber for rotative and transverse tilting movements therein relative to said seat to control flow through the openings, an operating mechanism for imparting rotative and transverse tilting movements to the valve core; a connection extending between and tiltable transversely relative to the operating mechanism and valve core for transmitting movement from said mechanism to said core, the connection including a ball and socket, the ball being carried by said connection and movement of said connection being about the axis of said ball.

6. In a valve having inlet and outlet openings in its body, a chamber communicating with the openings and having a seat, a valve core journaled in the chamber for rotative and transverse tilting movements therein relative to said seat to control flow through the openings, an operating mechanism for imparting rotative and transverse tilting movements to the valve core; an independent connection extending between and tiltable transversely relative to the operating mechanism and valve core for transmitting movement from said mechanism to said core, a ball carried by the connection, a complementary socket in the body for the ball, and packing in the socket for sealing off around said ball.

7. A valve seal as set forth in claim 6 wherein the connection is pivotally connected to the valve core so as to undergo limited pivotal movement relative thereto.

8. A valve seal as set forth in claim 6 wherein the connection is pivotally connected to the valve core and operating mechanism so as to undergo limited pivotal movement relative to said core and mechanism.

9. A valve seal as set forth in claim 6 wherein the connection includes a member carrying the ball and having a bore, and a stem secured to the valve core and pivotally engaged in the bore of the member whereby limited pivotal movement of the core and member relative to each other is permitted.

10. In a valve having inlet openings in its body, a chamber communicating with the openings and having a seat, a valve core journaled in the chamber for rotative and transverse tilting movements therein relative to said seat to control flow through the openings, an operating mechanism for imparting rotative and transverse tilting movements to the valve core; an independent connecting member extending between and tiltable transversely relative to the operating mechanism and valve core for transmitting movement from said mechanism to said core, the connecting member having a ball about the axis of which said connecting member is movable, a socket in the valve body for the ball, a bearing surrounding said ball for absorbing thrusts exerted upon said core, and packing in the socket for sealing off around said ball irrespective of movement of said connecting member.

11. A valve seal as set forth in claim 10 wherein the connecting member has pivotal connection with the valve core so as to undergo limited pivotal movement relative thereto.

12. A valve including, a body having a chamber and inlet and outlet openings and having a seat communicating with the chamber, a valve core mounted in said chamber for rotative and transverse tilting movements therein relative to said seat for controlling flow through the openings, an operating mechanism for imparting rotative and transverse tilting movements to the valve core, and an independent connection extending between and tiltable transversely relative to the mechanism and core for transmitting movement from said mechanism to said core, the connection including a ball and socket and being movable about the axis of the ball.

13. A valve as set forth in claim 12 wherein the connection is pivotally connected to the valve core so as to undergo limited pivotal movement relative thereto.

14. A valve including, a body having a chamber and inlet and outlet openings and having a seat communicating with the chamber, a valve core mounted in said chamber for rotative and transverse tilting movements therein relative to said seat for controlling flow through the openings, an operating mechanism for imparting rotative and transverse tilting movements to the valve core, an independent connection extending between and tiltable transversely relative to the mechanism and core for transmitting movement from said mechanism to said core, the connection including a ball and socket and being movable about the axis of the ball, and packing in the socket surrounding said ball for sealing off therearound and between said mechanism and chamber.

15. A valve including, a body having a chamber and inlet and outlet openings and having a seat communicating with the chamber, a valve core mounted in said chamber for rotative and transverse tilting movements therein relative to said seat for controlling flow through the openings, an operating mechanism for imparting rotative and transverse tilting movements to the valve core, an independent connecting member extending between and tiltable transversely relative to the mechanism and core for transmitting movement from mechanism to said core, the connecting member having a spherical enlargement about the axis of which said member is movable, a socket for supporting the enlargement, and packing in the socket for sealing off around said enlargement and between said mechanism and chamber.

16. A valve as set forth in claim 15 wherein the packing includes a sealing ring encircling the enlargement and plastic packing surrounding the ring for maintaining said ring in sealing engagement with said enlargement.

17. A valve including, a body having a chamber and inlet and outlet openings and having a seat communicating with the chamber, a valve core mounted in said chamber for rotative and transverse tilting movements therein relative to said seat for controlling flow through the openings, an operating mechanism for imparting rotative and transverse tilting movements to the valve core, an independent connecting member extending between and tiltable transversely relative to the mechanism and core for transmitting movement from said mechanism to said core, the connecting member having a spherical enlargement about the axis of which said member is movable, a socket for supporting the enlargement, packing in the socket for sealing off around said enlargement and between said mechanism and chamber, and a thrust bearing forming a part of the socket for absorbing the loads imposed upon said core.

18. A valve including, a body having a chamber and inlet and outlet openings and having a seat communicating with the chamber, a valve core mounted in said chamber for rotative and transverse tilting movements therein relative to said seat for controlling flow through the openings, an operating mechanism for imparting rotative and transverse tilting movements to the valve core, an independent connecting member extending between and tiltable transversely relative to the mechanism and core for transmitting movement from mechanism to said core, the connecting member being substantially hollow and having an external substantially spherical enlargement about the axis of which said member is pivotal, a socket in the body for supporting the enlargement, packing in the socket surrounding and sealingly engaging the enlargement so as to seal off between said mechanism and chamber, and a stem secured to said core and engaging in said member, the stem having limited pivotal connection with said member.

References Cited in the file of this patent

UNITED STATES PATENTS

| Number | Name | Date |
|---|---|---|
| 902,952 | Eggleston | Nov. 3, 1908 |
| 945,433 | Allen | Jan. 4, 1910 |
| 1,111,598 | Marsh | Sept. 22, 1914 |
| 1,989,009 | Heggem | Jan. 22, 1935 |
| 2,039,220 | Heggem | Apr. 28, 1936 |
| 2,076,838 | Heggem | Apr. 13, 1937 |
| 2,076,839 | Heggem | Apr. 13, 1937 |
| 2,076,840 | Heggem | Apr. 13, 1937 |
| 2,076,841 | Heggem | Apr. 13, 1937 |
| 2,200,474 | Heggem | May 14, 1940 |

FOREIGN PATENTS

| Number | Country | Date |
|---|---|---|
| 785,155 | France | Aug. 3, 1935 |